United States Patent [19]

Hensler et al.

[11] 4,255,274
[45] Mar. 10, 1981

[54] PREPARATION OF GRANULAR SODIUM TRIPOLYPHOSPHATE PRODUCTS

[75] Inventors: Paul L. Hensler; Delmar F. Church, both of Lawrence, Kans.; Robert W. Beger, Mount Zion, Ill.

[73] Assignee: FMC Corporation, Philadelphia, Pa.

[21] Appl. No.: 619

[22] Filed: Jan. 2, 1979

[51] Int. Cl.³ .................... C01B 15/16; C11D 7/16
[52] U.S. Cl. .......................... 252/135; 423/315
[58] Field of Search .......... 23/293 R, 313 R, 313 FB, 23/313 P; 252/135

[56] References Cited

U.S. PATENT DOCUMENTS

| | | | |
|---|---|---|---|
| 3,056,652 | 10/1962 | Ryer | 252/135 X |
| 3,076,248 | 2/1963 | Darrow et al. | 23/313 X |
| 3,233,967 | 2/1966 | Shen | 252/135 X |
| 3,338,671 | 8/1967 | Marshall et al. | 252/135 X |
| 3,384,454 | 5/1968 | Heymer et al. | 423/315 |
| 3,387,923 | 6/1968 | Shen | 23/313 X |
| 3,469,938 | 9/1969 | McLeod et al. | 423/315 |
| 3,620,972 | 11/1971 | Fite | 252/1 |
| 3,761,573 | 9/1973 | Hinz et al. | 423/315 |
| 3,852,212 | 12/1974 | Groening et al. | 252/135 |
| 3,932,590 | 1/1976 | Pals et al. | 423/315 |
| 3,933,670 | 1/1976 | Brill et al. | 252/99 |
| 4,134,963 | 1/1979 | Pals | 423/315 |

Primary Examiner—P. E. Willis, Jr.
Attorney, Agent, or Firm—Christine M. Miles; Frank Ianno

[57] ABSTRACT

Dense rotary dried sodium tripolyphosphate (STPP) particles having a bulk density of at least 0.9 g/cc and a particle size distribution of 0 to 85% by weight +20 mesh, 15 to 100% by weight −20 +100 mesh and 0 to 20% by weight −100 mesh are moisturized by adding a sufficient amount of water to produce a material containing on the average between about 10% and about 30% by weight moisture. The moisturized material is calcined to a temperature within the range of from about 300° to about 600° C., to produce a granular STPP product having low friability, high absorptivity and a bulk density within the range of from about 0.65 to about 0.87 g/cc.

16 Claims, No Drawings

PREPARATION OF GRANULAR SODIUM TRIPOLYPHOSPHATE PRODUCTS

The present invention relates to a process for preparing granular sodium tripolyphosphate (STPP) products having low friability, high absorptivity and a bulk density within the range of from about 0.65 to about 0.87 g/cc, wherein there is employed as the feed, a dense rotary dried STPP material having a bulk density of at least 0.9 g/cc and a particle size distribution of 0 to 85% by weight +20 mesh, 15 to 100% by weight −20+100 mesh and 0 to 20% by weight −100 mesh.

In the formulation of modern detergent compositions, granular STPP has come into widespread use as a phosphate "builder" which increases the cleaning ability of these detergent compositions. STPP is produced by initially reacting phosphoric acid and an alkaline compound such as sodium hydroxide or sodium carbonate together in an aqueous solution such that the molar ration of sodium to phosphorus is on the order of about 1.67. This reaction results in the formation of an aqueous mixture containing monosodium orthophosphate and disodium orthophosphate in a mole ratio of about 1:2.

STPP can be produced therefrom in either a rotary kiln or a spray dryer. In the case of the rotary kiln, the free water is removed from the phosphate mixture by passing it through a heating zone where it is progressively heated to higher temperatures. At a temperature of about 250° C. or higher, STPP is formed.

While the exact mole ratio of sodium to phosphorus in the aqueous orthophosphate solution which is employed may be varied, the ultimate reaction takes place in accordance with the following equation:

$$NaH_2PO_4 + 2Na_2HPO_4 \rightarrow Na_5P_3O_{10} + 2H_2O$$

The resulting STPP is a crystalline anhydrous product capable of having two physical forms. Form I is typically produced when calcination temperatures of from about 500° C. to about 600° C. are employed while Form II is typically produced when calcination temperatures below about 500° C. are employed.

In formulating free-flowing, essentially homogeneous detergent compositions containing a granular STPP product, the STPP employed has been manufactured so that its various physical properties suit the ultimate use of the formulation and/or the method by which the formulation is prepared. Physical properties of a granular STPP product which are generally important in preparing such compositions include bulk density, friability and absorptivity. Additionally, the disolution time of a granular STPP product can become important, as for example, in the preparation of dry mixed automatic dishwashing detergents.

Bulk density may be defined in terms of the weight of STPP which freely flows into a container of given volume. A convenient method for measuring bulk density, and the method used herein is the Solvay Process Method 302A descibed in the Solvay Technical and Engineering Service Bulletin No. 9, (page 33) issued in 1944. Typically, the low bulk density product (generally 0.45–0.59 g/cc) is used in home laundry and presoak detergent formulations. Medium density STPP is generally used in automatic dishwashing compositions, and the higher density product (generally greater than 0.75 g/cc) is used in formulating heavy-duty cleaners as, for example, floor and wall cleaners.

Friability relates to particle strength: the lower the percent friability, the stronger the STPP particle. Generally, particles of low friability are desired to prevent fracturing of the STPP particles during mixing, handling and transporting the detergent formulations. Friability values below 30% are generally desired for commercial use. Values below 20% are considered good and below 10% excellent.

Absorptivity relates to the ability of a particle to absorb various liquid components employed in the formulation of detergent compositions. High absorptivity values are a critical factor, for example, in formulating free-flowing detergent compositions which contain liquid surfactants, as dry mixed automatic dishwashing compositions. Absorptivity values above 10% are generally desired in formulating such compositions. Values above 15% are considered very good and above 20% excellent.

The procedures employed in measuring friability, absorptivity and dissolution time are detailed below, immediately preceding Example I.

One problem faced by manufacturers is that many existing plant facilities have a limited ability for producing more than one bulk density range of granular STPP. This is the case with most rotary kiln processes, which typically produce a product having a bulk density of about 0.90 to 1.00 g/cc. Consequently, a process to which such existing plants could easily adapt, which would provide a lower bulk density granular product and thereby increase flexibility in the bulk density range that can be produced, is highly desirable. Such a process which additionally provides a granular STPP product having high absorptivity and low friability is especially desirable.

It has been discovered that granular sodium tripolyphosphate products having low friability, high absorptivity, and a bulk density within the range of from about 0.65 g/cc to about 0.87 g/cc can be prepared by a process which comprises moisturizing an agitated dense rotary dried sodium tripolyphosphate feed material having a bulk density of at least 0.9 g/cc and a particle size distribution of 0 to 85% by weight +20 mesh, 15 to 100% by weight −20 +100 mesh and 0 to 20% by weight −100 mesh by adding a sufficient amount of water thereon to produce a moisturized material containing on the average between 10 and 305 by weight moisture, calcining the moisturized material to a temperature within the range of from about 300° to about 600° C. and recovering said granular sodium tripolyphosphate product.

The primary moisturization step feed (that is feed prior to admixture with any process undersize recycle material) is a dense (bulk density of 0.90 g/cc or greater) essentially non-hydrated rotary dried STPP material having a particle size distribution of 0 to 85% by weight +20 mesh, 15 to 100% by weight −20 +100 mesh and 0 to 20% −100 mesh. Preferably, this feed has a particle size distribution of 40 to 65% by weight +20 mesh, 30 to 55% by weight −20 +100 mesh and 0 to 10% by weight −100 mesh. All particle size designations herein represent U.S. Standard Screen values.

The primary moisturization step feed is the actual feed where nor process undersize STPP is recycled. When a continuous process is employed, however, it is preferable to recycle the process undersize material to the moisturization step. Process undersize STPP is understood herein to constitute product screen undersize STPP particles and STPP particles (generally partially hydrated) collected from the hydrator and/or calciner exit gas stream by, for example, a dry cyclone. The unqualified expression "moisturization step feed" is understood herein to mean the actual moisturization step feed.

Form I and/or Form II STPP may be employed as feed to the moisturization step. The Form I and II content of the final calcined product is essentially controlled by the material calcination temperature of the moisturized STPP. (There are no Form designations in the hydrated state.)

In carrying out the process of the invention, a sufficient amount of water is added to the moisturization step feed to produce a product containing, on the average, between 10 and 30% by weight of moisture. The 10-30% amount of moisture, represents both bound and free water. Generally, the moisturization step effects an agglomeration of the hydrator feed, particularly of any fines (that is, −100 mesh material) in said feed.

Both the amount of water added and the particle size of the moisturization step feed have been found to be factors in controlling the bulk density of the final product, the former appearing to be the more significant factor. Up to a point, increasing the amount of water added to the moisturization step feed tends to decrease the bulk density of the final product. This effect is thought to diminish and eventually reverse itself when sufficient water is present to effect a dissolution of a portion of the feed. The bulk density of the final product also tends to be reduced by decreasing the weighted average particle size of the moisturization step feed.

The term "water" is to be understood to mean pure water, or water containing minor amounts, that is less than 15% by weight of STPP or other such polyphosphate salts. Water containing such minor amounts of STPP may be used when it is desired to recycle water in a commercial production plant obtained, for example, from pollution control equipment.

The temperature of the water sprayed is not critical, but it is preferably within the range of from 10° to 50° C. It is generally impractical to employ temperatures greater than 80° C. or temperatures below 5° C.

The moisturization step feed is subjected to agitation as the water is added. This effects a more uniform distribution of water on the feed and tends to agglomerate the feed, particularly any fines in the feed. Preferably the moisturization step feed is agitated by rotation. Equipment in which the moisturization step may be carried out and which provide the preferred agitation include, for example, a rotary disc granulator and a rotating horizontal drum hydrator with lifting flights (see also equipment described in U.S. Pat. Nos. 3,154,496 and 3,625,902). Spraying is the most preferred method of water addition and may be done by any of the conventional spraying means, which include, for example, air atomized or pneumatic spray nozzles.

The moisturized product is then calcined to a temperature within the range of from about 300° C. to about 600° C., the temperature being selected to produce the desired Form I and/or Form II content in the final STPP product. Typically, times on the order of 5 to 45 minutes are employed in reaching the selected temperature but shorter or longer times may be used where desired. Although any suitable calciner may be employed, a rotary calciner is preferred.

A single reactor which sequentially effects the moisturization and calcination steps may be used, or a separate calciner and moisturizer may be employed. The former may be desired, for example, when a rotating horizontal drum agglomerator is used in the moisturization step. In such instances, calcination may be effected by directly or indirectly heating the rotating horizontal drum.

STPP particles in the hydrator and calciner exit gas streams are preferably recovered by, for example, a dry cyclone, and recycled to the moisturization step. Generally, such recycled material contains partially hydrated STPP particles which when mixed with the recycle from the product screens and the primary moisturization step feed provide an actual moisturization step feed having on the average between about 1 and 12% moisture.

The calcined granular STPP products of the invention are recovered, generally by screening the calcinate to isolate the desired product fraction. For commercial purposes the granular product fraction isolated is generally encompassed by the fraction −16 +100 mesh. Typical granular fractions isolated include, for example, −16 +94, −20 +80 and −20 +100 mesh. Such fractions are provided by the present invention. Preferably, recovery of the granular STPP product includes milling, then rescreening any product screen oversize material. Further, where a continuous process is employed, the product screen undersize material is preferably recycled to the moisturization step.

Granular STPP products were obtained from the above described process having low friability, high absorptivity and a bulk density within the range of from about 0.65-0.87 g/cc. The bulk density of the primary moisturization step feed can be reduced by 0.20 to 0.25 g/cc in carrying out the process of the invention. The above described process can be carried out in either a batch or continuous fashion, as desired. Preferably, however, the invention is carried out as a continuous process.

The examples below are given to illustrate the invention and are not intended to be limiting thereof.

FRIABILITY DETERMINATION PROCEDURE

Friability as described and reported herein is determined as follows: Two approximately 65 g samples (Samples 1 and 2) from a homogenized portion of the product to be tested are weighed to the nearest 0.01 g. Sample 1 is transferred to the top screen of a nest including 20, 30 and 100 mesh (U.S. Standard) screens. The screen nest with sample is placed on a Ro Tap sieve shaker (manufactured by W. S. Tyler, Inc.) and shaken for 10 minutes. The amount of material which passed through the 100 mesh screen is weighed. The % by weight of Sample 1 which passed through the 100 mesh screen is then calculated.

Sample 2 is transferred to an essentially vertical, 1" (diameter)×24" glass tube. A nonporous, cupped device suitable for collecting dust (for example, a Soxhlet extraction thimble) is fitted over the top opening of the glass tube preferably by means of a rubber tube.

Dry air is blown upwardly through the glass tube at a rate of 0.25 SCFM for a period of 10 minutes. The sample is thus fluidized and is maintained in a fluidized state for the 10 minute period. Thereafter, the material in the tube and in the dust collector is transferred to the top screen of a Ro Tap sieve shaker and treated in the same manner as Sample 1. Calculation is then made of the % by weight of Sample 2 which passed through the 100 mesh screen.

%Friability = % by weight of Sample 2 passed through 100 mesh screen—% by weight of Sample 1 passed through 100 mesh screen

ABSORPTIVITY DETERMINATION PROCEDURE

Absorptivity as described and reported herein is determined as follows: Twenty grams of STPP sample to be tested are thoroughly mixed with 5 ml of an octylphenoxypolyethoxy ethanol wetting agent commercially sold as Triton ® X-100 in a 250 ml beaker. Approximately 20 g of dry granular light density (0.45–0.55 g/cc) STPP particles are placed in the bottom of a centrifuge tube to absorb any excess Triton ® X-100 not absorbed by the sample being tested. A perforated rubber stopper having a milk pad filter paper disc on the top thereof and an affixed wire handle, is slid down the tube and forced against the dry phosphate in the bottom of the tube. The mixture of sample being tested and Triton ® X-100 is then transferred to the centrifuge tube. The tube with contents are centrifuged at a speed of about 4,000 rpm for 10 minutes. The sample with absorbed Triton ® X-100, that is, the material on top of the rubber stopper, is removed from the centrifuge tube and weighed.

$$\% \text{ absorbitivity} = \frac{\text{Weight of sample with absorbed Triton ® X-100} - \text{initial sample weight}}{\text{Weight of sample with absorbed Triton ® X-100}} \times 100$$

DISSOLUTION TIME DETERMINATION PROCEDURE

Dissolution time as described and reported herein is determined as follows: Three hundred milliliters of distilled water at 21°±2° C. are placed in a 600 ml low form beaker (for example, a Kimax-Kimble 14005 beaker). The stirring rod of a constant rpm stirrer (for example, a Phipps-Bird multiple stirring apparatus is adjusted so that the stirring blade rests on the bottom of the low form beaker. A 36±0.1 gram sample of the material to be tested is weighed. The stirrer is turned on and adjusted to operate at 100 rpm. A timer is started, and the sample is added to the beaker in approximately 15 seconds (addition time). The time (final time) is recorded when only a few granules (less than 10) remain undissolved.

Dissolving time = Final time — Addition time

EXAMPLE I

Two runs (Run A, a 5 hour run and Run B, a 3 hour run) were made using a dense (bulk density of 0.90 g/cc or greater) rotary dried STPP feed having, on the average, a particle size within the preferred distribution of 40 to 65% by weight +20 mesh, 30 to 55% by weight −20 +100 mesh and 0 to 10% by weight −100 mesh. The STPP was continuously fed at a rate of about 500 pounds per hour (pph) to a rotary drum hydrator (27 inch inside diameter; 14 foot length; 0.2 inch per foot slope) equipped with four air atomized spray nozzles. The hydrator was rotated at a speed of 22 rpm. Water, having a temperature of about 13°–16° C., was sprayed onto the rotating bed of STPP at a rate sufficient to provide a calcination step feed having between 12.8 and 21.5% by weight of moisture (bound and/or free). Values for the physical measurements made on selected samples of moisturization step feed and calcination step feed (that is, the moisturized material) taken during operation of the runs are given in Table I. Run average and range values are given for each type of measurement.

The material from the hydrator was continuously fed to a countercurrent rotary calciner (15.5 inch inside diameter; 11 foot 1.5 inch length) rotated at a speed of about 27 rpm. Heating was effected by a natural gas flame at the material discharge point of the calciner. The moisturized feed was calcined to a temperature of from about 440° to about 480° C. The calcined product was screened by a commercial screening operation employing 16 mesh top deck and 94 mesh bottom deck screens (product screens). Oversize material from the product screens was continuously milled and recycled to the product screens. A −16 +94 mesh product fraction is recovered from the product screens.

Particle size distribution, bulk density, absorptivity, friability, STPP assay and Form I content measurements were made on selected samples (taken at various times during operation of the run) of the −16 +94 mesh product fractions. Run average and range values are given in Table I for each type of measurement.

As can be seen from the data, granular STPP products of high absorptivity (about two times that of the feed), low friability and a bulk density within the range of 0.731–0.863 g/cc were obtained. During Run B, bulk density measurements were also made on selected samples of feed; the data shows, on the average, a 0.203 g/cc bulk density reduction from the feed for the products obtained. Further, the % assay of STPP remained about the same in carrying out the process.

EXAMPLE II

The equipment and procedure employed in this example are identical to Example I except that process undersize STPP from the product screens and dry cyclone (collects undersize STPP from the hydrator and calciner exit gas streams) was continuously recycled to the moisturization step.

Two continuous runs (Run C, a 5½ hour run and Run D, a 19 hour run) were made during which an STPP feed of the type described in Example I (primary feed) was fed to the hydrator at a rate of about 500 pph. Additionally, all process undersize STPP was continuously recycled to the moisturization step. The recycle from the cyclone contained some hydrated STPP material which when combined with the primary feed produced an actual moisturization step feed having from about 1 to about 7% by weight moisture.

The hydrator was rotated at a speed of 22 rpm. Water having a temperature of about 13°–16° C. was sprayed onto the rotating bed of STPP at a rate sufficient to provide a calcination step feed having 15.3–23.4% by weight of moisture (bound and/or free).

Values for the physical measurements made on selected samples of moisturization step feed and calcination step feed taken during operation of the run are given in Table II. Run average and range values are given for each type of measurement.

The moisturized products were calcined to a temperature of from about 440° to about 480° C., in the manner described in Example I. The calcined products were then screened as in Example I, and the product screen oversize material was continuously milled and recycled to the product screens. Product screen undersize material and undersize material from the hydrator and calciner exit gas streams (collected in a dry cyclone) were continuously recycled to the moisturization step.

Particle size distribution, bulk density, absorptivity, friability, STPP assay and Form I content measurements were made on selected samples (taken at various times during operation of the run) of the −16 +94 mesh product fraction. Additionally, for Run D, dissolving time measurements were made on similarly selected samples. Run average and range values are given in Table II for each type of measurement.

As can be seen from the data, granular STPP products of high absorptivity, low friability and a bulk density within the range of 0.702–0.798 g/cc were obtained. During Run D, bulk density measurements were also made on selected samples of feed; the data shows, on the average, a 0.202 g/cc bulk density reduction from the feed for the products obtained. Further, the % assay of STPP increased, on the average, by about 4.7% in carrying out the process.

The dissolving time measurements made on selected samples taken during the operation of Run D had an average value of 3 minutes and 56 seconds. Dissolving time values between about 3 and 6 minutes are considered to be good by the industry for granular STPP products within the density range of 0.65–0.87 g/cc.

TABLE I

Production of Granular STPP Products
From Dense Granular Rotary Dried STPP
(Without Recycle of Process Undersize Material)

Part I: Particle Size Distribution Measurements

| Run | STPP | | % By Weight Through Indicated U.S. Standard Screens | | | | | |
|---|---|---|---|---|---|---|---|---|
| | | | +12 | +16 | +20 | +30 | +50 | +100 |
| | Moisturi- | average | 13.0 | 23.7 | 56.8 | 77.8 | 91.3 | 96.1 |
| | zation | range | 11.4− | 21.2− | 53.2− | 74.1− | 88.8− | 94.2− |
| | step feed | | 14.8 | 6.1 | 60.2 | 83.3 | 93.4 | 97.0 |
| A | Product | average | 0.01 | 0.01 | 21.8 | 49.1 | 85.3 | 98.4 |
| | (−16 +94 | range | 0.0− | 0.0− | 19.5− | 29.3− | 83.5 | 98.1− |
| | mesh fraction) | | 0.02 | 0.02 | 24.4 | 58.4 | 87.8 | 99.2 |
| | Moisturi- | average | 6.1 | 14.3 | 47.3 | 75.9 | 88.5 | 94.4 |
| | zation | range | 4.0− | 9.9− | 42.7− | 69.1− | 87.1− | 89.5− |
| | step feed | | 8.3 | 18.4 | 50.5 | 78.7 | 91.4 | 96.4 |
| B | Product | average | 0.0 | 0.0 | 20.8 | 52.5 | 84.7 | 98.4 |
| | (−16 +94 | range | 0.0− | 0.0− | 16.7− | 42.7− | 87.2− | 97.7− |
| | mesh fraction) | | 0.0 | 0.01 | 24.3 | 58.6 | 88.9 | 99.1 |

Part II: Other Physical Measurements

| Run | STPP | | % Moisture | g/cc Bulk Density | % Absorbtivity | % Friability | % Form I | % Assay STPP |
|---|---|---|---|---|---|---|---|---|
| | Moisturi- | average | | | 10.4 | | 24.5 | 89.8 |
| | zation | range | | | 9.5− | | 18.2− | 89.4− |
| | step feed | | | | 12.2 | | 33.3 | 90.2 |
| | Calcina- | average | 15.6 | | | | | |
| A | tion | range | 12.8− | | | | | |
| | step feed | | 21.5 | | | | | |
| | Product | average | | 0.798 | 20.6 | 16.5 | 20.7 | 89.7 |
| | (−16 +94 | range | | 0.731− | 19.6− | 12.8− | 14.8− | 89.4− |
| | mesh fraction) | | | 0.863 | 21.1 | 20.7 | 38.8 | 90.0 |
| | Moisturi- | average | | 0.961 | 11.1 | | 19.9 | 91.4 |
| | zation | range | | 0.955− | 8.7− | | 16.2− | 90.9− |
| | step feed | | | 0.969 | 3.5 | | 23.9 | 92.3 |
| | Calcina- | average | 18.7 | | | | | |
| B | tion | range | 17.3− | | | | | |
| | step feed | | 21.3 | | | | | |
| | Product | average | | 0.758 | 21.5 | 14.0 | 24.7 | 92.6 |
| | (−16 +94 | range | | 0.735− | 20.9− | 11.1− | 20.5− | 90.4− |
| | mesh fraction) | | | 0.781 | 21.8 | 16.0 | 28.9 | 94.0 |

TABLE II

Production of Granular STPP Products
From Dense Granular Rotary Dried STPP
(With Recycle of Process Undersize Material)

Part I: Particle Size Measurements

| Run | STPP | | % By Weight Through Indicated U.S. Standard Screens | | | | | |
|---|---|---|---|---|---|---|---|---|
| | | | +12 | +16 | +20 | +30 | +50 | +100 |
| | Primary* | average | 23.6 | 28.4 | 46.5 | 64.5 | 84.0 | 91.1 |
| | Moisturi- | range | 15.6− | 23.0− | 38.1− | 57.1− | 79.8− | 87.8− |
| | zation | | 31.1 | 37.2 | 63.6 | 82.1 | 92.8 | 96.1 |
| C | step feed | | | | | | | |
| | Product | average | 0.01 | 0.01 | 12.9 | 44.9 | 88.0 | 99.2 |
| | (−16 +94 | range | 0.0− | 0.0− | 11.3− | 42.8− | 87.1− | 99.1− |
| | mesh fraction) | | 0.05 | 0.06 | 14.7 | 49.2 | 88.8 | 99.2 |
| | Primary* | average | 1.6 | 23.7 | 48.5 | 66.1 | 84.8 | 90.9 |
| | Moisturi- | range | 11.2− | 21.1− | 42.0− | 59.1− | 77.6− | 86.7− |
| | zation | | 32.7 | 37.6 | 54.6 | 72.2 | 89.8 | 94.0 |
| D | step feed | | | | | | | |

TABLE II-continued

Production of Granular STPP Products
From Dense Granular Rotary Dried STPP
(With Recycle of Process Undersize Material)

| Product<br>(−16 +94<br>mesh fraction) | average<br>range | 0.0<br>0.0−<br>0.01 | 0.01<br>0.0−<br>0.02 | 11.7<br>1.6−<br>19.4 | 40.6<br>25.3−<br>53.3 | 79.8<br>72.8−<br>93.1 | 98.2<br>95.9−<br>99.3 | |

| Run | | STPP | % Moisture | g/cc Bulk Density | % Absorb-tivity | % Fria-bility | % Form I | % Assay STPP | Dissolving time min:sec |
|---|---|---|---|---|---|---|---|---|---|
| C | | Primary*<br>Moisturi-<br>zation<br>step feed | average<br>range | | | | | | 89.3<br>88.8−<br>89.8 | |
| | | Calcina-<br>tion<br>step feed | average<br>range | 19.7<br>15.3−<br>23.0 | | | | | | |
| | | Prouct<br>(−16 +94<br>mesh fraction) | average<br>range | | 0.737<br>0.702−<br>0.793 | 20.8<br>18.5−<br>21.5 | 10.6<br>8.0−<br>12.4 | 21.0<br>17.3−<br>24.0 | 94.0<br>93.8−<br>94.2 | |
| D | | Primary*<br>Moisturi-<br>zation<br>step feed | average<br>range | | 0.958<br>0.957−<br>0.959 | | | | 89.4<br>87.0−<br>91.1 | |
| | | Calcina-<br>tion<br>step feed | average<br>range | 20.5<br>17.2−<br>23.4 | | | | | | |
| | | Product<br>(−16 +94<br>mesh fraction) | average<br>range | | 0.756<br>0.732−<br>0.798 | 20.6<br>18.3−<br>22.4 | 11.4<br>7.8−<br>13.3 | 23.1<br>14.4−<br>34.8 | 94.1<br>89.9−<br>95.7 | 3:56<br>3:05−<br>4:33 |

*feed without process recycle

We claim:

1. A process for producing a granular sodium tripolyphosphate product having low friability, high absorptivity, and a bulk density within the range of from about 0.65 g/cc to about 0.87 g/cc, which comprises moisturising an agitated feed material consisting essentially of dense rotary dried sodium tripolyphosphate (in essentially non-hydrated form) having a bulk density of at least 0.9 g/cc and a particle size distribution of 0 to 85% by weight +20 mesh, 15 to 100% by weight −20 +100 mesh and 0 to 20% by weight −100 mesh, by adding a sufficient amount of water thereon to produce a moisturized material containing on the average between 10 and 30% by weight moisture, calcining the moisturized material to a temperature within the range of from about 300° to about 600° C. and recovering said granular sodium tripolyphosphate product.

2. The process of claim 1 wherein the sodium tripolyphosphate feed material has a particle size distribution of 40 to 65% by weight +20 mesh, 30 to 55% by weight −20 +100 mesh and 0 to 10% by weight −100 mesh.

3. The process of claim 1 wherein the sodium tripolyphosphate feed is agitated by rotation.

4. The process of claim 1 wherein the water is added onto the agitated sodium tripolyphosphate feed by spraying.

5. The process of claim 1 wherein the granular sodium tripolyphosphate product recovered is encompassed by the fraction −16 +100 mesh.

6. A continuous process for producing a granular sodium tripolyphosphate product having low friability, high absorptivity and a bulk density within the range of from about 0.65 g/cc to about 0.87 g/cc, which comprises continuously moisturizing an agitated feed material consisting essentially of sodium tripolyphosphate which, other than any portion of material recycled from this process, is a dense rotary dried material in essentially non-hydrated form having a bulk density of at least 0.9 g/cc and a particle size distribution of 0 to 85% by weight +20 mesh, 15 to 100% by weight −20+100 mesh and 0 to 20% by weight −100 mesh, by adding a sufficient amount of water thereon to continuously produce a moisturized material containing between 10 and 30% by weight moisture, continuously calcining the moisturized material to a temperature within the range of from about 300° to about 600° C. and continuously recovering said granular sodium tripolyphosphate product.

7. The process of claim 6 wherein the sodium tripolyphosphate feed material has a particle size distribution of 40 to 65% by weight +20 mesh, 30 to 55% by weight −20+100 mesh and 0 to 10% by weight −100 mesh.

8. The process of claim 6 wherein the sodium tripolyphosphate feed is agitated by rotation.

9. The process of claim 6 wherein the water is added on to the agitated sodium tripolyphosphate feed by spraying.

10. The process of claim 6 wherein the granular sodium tripolyphopsphate product recovered is encompassed by the fraction −16 to +100 mesh.

11. A continuous process for producing a granular sodium tripolyphosphate product having low friability, high absorptivity, and a bulk density within the range of from about 0.65 g/cc to about 0.87 g/cc, which comprises continuously moisturizing an agitated feed material consisting essentially of dense rotary dried sodium tripolyphosphate together with recycled sodium tripolyphosphate produced in the process, said dense rotary dried sodium tripolyphosphate being in essentially non-hydrated form and having a bulk density of at least 0.9 g/cc and a particle size distribution of 0 to 85% by weight +20 mesh, 15 to 100% by weight −20+100 mesh and 0 to 20% by weight −100 mesh, by adding a sufficient amount of water thereon to continuously produce a moisturized material containing between 10 and 30% by weight moisture, continuously calcining the moisturized material to a temperature within the range of from about 300° C. to about 600° C., continuously recovering said granular sodium tripolyphosphate product, and continuously recycling process undersize material to the moisturization step.

12. The process of claim 11 wherein the dense rotary dried sodium tripolyphosphate feed material has a particle size distribution of 40 to 65% by weight +20 mesh, 30 to 55% by weight −20+100 mesh and 0 to 10% by weight −100 mesh.

13. The process of claim 11 wherein the sodium tripolyphosphate feed is agitated by rotation.

14. The process of claim 11 wherein the water is added onto the agitated sodium tripolyphosphate feed by spraying.

15. The process of claim 11 wherein the granular sodium tripolyphosphate product recovered is encompassed by the fraction −16+100 mesh.

16. A process for producing a granular sodium tripolyphosphate product having low friability, high absorptivity, and a bulk density within the range of from about 0.65 g/cc to about 0.87 g/cc, which comprises moisturizing an agitated feed material consisting essentially of sodium tripolyphosphate which, other than any portion of material recycled from this process, is a dense rotary dried material in essentially non-hydrated form having a bulk density of at least 0.9 g/cc and a particle size distribution of 0 to 85% by weight +20 mesh, 15 to 100% by weight −20+100 mesh and 0 to 20% by weight −100 mesh, by adding a sufficient amount of water thereon to produce an agglomerated material containing on the average between 10 and 30% by weight moisture, calcining the agglomerated material to a temperature within the range of from about 300° to about 600° C. and recovering said granular sodium tripolyphosphate product.

* * * * *